No. 807,748. PATENTED DEC. 19, 1905.
G. KNADLER.
ELASTIC VEHICLE TIRE.
APPLICATION FILED JULY 31, 1905.

Witnesses.
A. E. Kling
Glenara Hoff

Inventor;
G. Knadler,
by C. E. Humphrey
Atty.

UNITED STATES PATENT OFFICE.

GODFRED KNADLER, OF AKRON, OHIO.

ELASTIC VEHICLE-TIRE.

No. 807,748.  Specification of Letters Patent.  Patented Dec. 19, 1905.

Application filed July 31, 1905. Serial No. 272,089.

*To all whom it may concern:*

Be it known that I, GODFRED KNADLER, a citizen of the United States, residing at Akron, in the county of Summit and State of Ohio, have invented new and useful Improvements in Elastic Vehicle-Tires, of which the following is a specification.

My invention has relation to improvements in elastic tires arranged to be mounted upon the rims of vehicle-wheels; and the object of this invention is to produce a strong, durable, and serviceable tire possessed of unusual resiliency of the general type known as "solid" tires as contradistinguished from the type of tire known as "pneumatic" wherein the cushioning qualities of the tire are derived from highly-compressed air within the tire-body.

The invention aims to provide an endless tire of the general type referred to with an approximately centrally-disposed annular opening or pocket throughout its entire body and to divide a portion of the tire circumferentially by a cut extending from the opening to the base portion of the tire existing throughout the entire length thereof, so that the base portion of the tire is thereby formed into two annular portions arranged to contact with each other.

The invention contemplates the seating of a tire thus constructed in such a manner on a rim that the two annular portions of the base of the tire will be pressed firmly against each other, and the invention further aims to so form the exterior of the tire-body that it will give peculiarly efficient results in increasing the elasticity and resiliency thereof and also be approximately free from the dangers of being cut or worn by the edges of the rim when under compression.

With the foregoing and other objects in view the invention consists of the novel construction, combination, and arrangement of parts constituting the device to be hereinafter referred to and illustrated in the accompanying drawings, which form a part of this specification, in which is shown the preferred embodiment of the invention; but it is to be understood that changes, variations, and modifications can be resorted to which come within the scope of the claim hereunto appended.

Figures 1, 2:
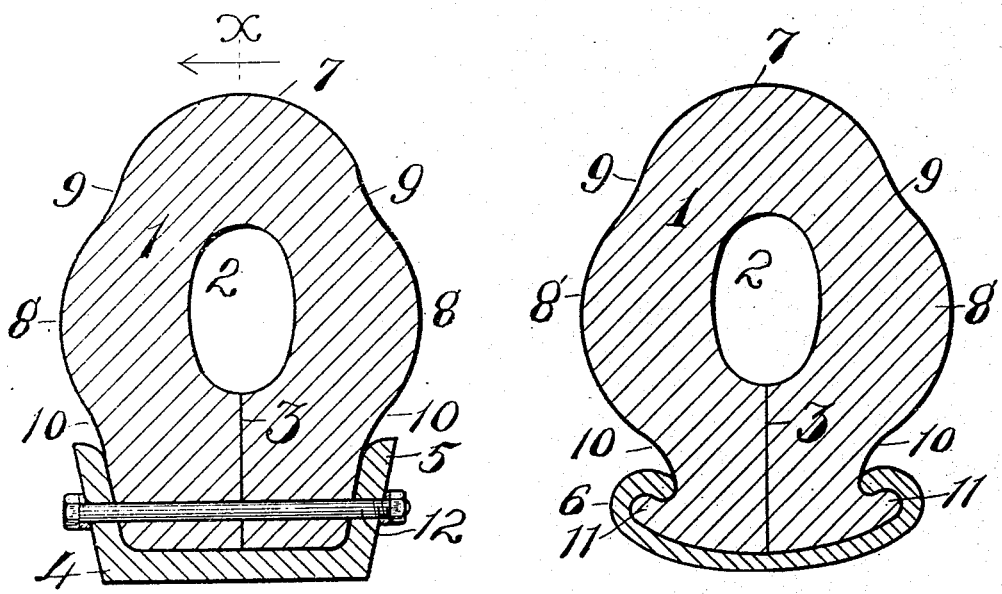
Figure 3:
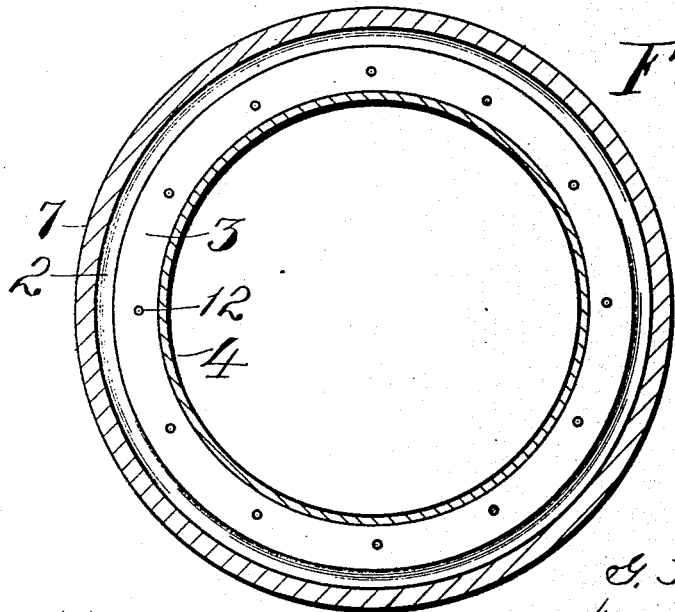

In the drawings, in which similar reference-numerals indicate like parts in the different figures, Figure 1 is a transverse section of my improved tire mounted upon an ordinary flanged rim having outwardly-flaring sides. Fig. 2 is a view similar to Fig. 1 with the tire shown as mounted upon a rim known as the "clencher" type, and Fig. 3 is a section of Fig. 1 at the line X.

In the drawings, 1 denotes the elastic tire-body, which is made endless as distinguished from those tires which are made in straight sections and subsequently wrapped about the rim on which they are seated and with their ends abutting. This tire is further provided with an approximately centrally-disposed annular opening 2, extending throughout the tire and arranged to be formed therein when the tire is vulcanized in the mold. This tire is further provided with a cut 3, extending from the bottom of the opening 2 to the base portion of the tire and extending circumferentially through the entire length of the tire-body, so as to divide the base portion into two parts. The tire-body, whether it is to be mounted upon the form of rim shown in Fig. 1, in which the reference-numeral 4 denotes the rim provided with upwardly and outwardly extending side flanges 5, or whether it is to be mounted upon a rim such as is shown in Fig. 2 and indicated by the reference character 6, which shows a clencher type of rim with inturned hooked edges, is constructed of vulcanized rubber or its equivalent of such a degree of elasticity as to thoroughly cushion the wheel and yet of sufficient stiffness to be capable of sustaining itself against crushing or collapsing.

In forming this tire it is preferably provided with a rounded tread portion 7 and outwardly-projecting convex side portions 8, the portions 7 and 8 being united by concave portions 9, and below the convex portions 8 the tire is inwardly converged upon concave lines to constitute the portions 10.

The tire is so constructed that the rim on which the tire is adapted to seat will engage it below the concave portions 10. If the tire is to be mounted upon a rim of the type shown in Fig. 1, the sides of the tire will be inwardly inclined upon approximately straight lines to nicely fit in the flanged rim 4; but if the tire is to be mounted upon a rim of the type shown in Fig. 2 the base portion will be provided with outwardly-extending annular members 11, over which the inturned side edges of the rim can engage, and thereby constitute the retaining means for the tire. In using a tire upon a rim of the form shown in Fig. 1 a series of bolts or retaining means 12 are passed at intervals through both of the flanges 5 and through the base porti tire 1, thereby securely anchoring it in position.

It will be seen from the foregoing description that pressure exerted upon the tread portion 7 of the tire will tend to flatten the rounded tread portion 7 and cause the concave portions 9 to expand outwardly to nearly approximately straight lines. Furthermore, the pressure exerted upon the tread portion 7 will tend to compress the material existing around the opening 2 and cause the opening to assume a shape more nearly resembling a true circle, and if this pressure is excessive it will tend in a certain degree to separate those portions of the tire existing along the cut 3, especially near the outer or upper portion of this cut, thereby giving additional resiliency to the tire. It will be further apparent that the existence of the concave portions 10 immediately above the edge of the rim on which the tire is mounted will permit the convex portions 8 to be compressed downwardly against the edges of the rim, and by reason of the existing concave portions 10 and the rounded shape of the edges of the rim the tire-body will be effectually insured against being chafed or cut by contact with the rim on which it is mounted.

It will be obvious that this invention provides a strong, serviceable, and exceedingly-durable tire possessed of high resiliency and absolutely puncture-proof and readily placed upon and removed from the rim when desired.

What I claim, and desire to secure by Letters Patent, is—

An improved tire for a vehicle-wheel consisting of an endless body of elastic material, provided throughout with an approximately centrally-disposed annular opening elliptical in cross-section, the major axis of which is radial with the wheel on which the tire is mounted, and further provided with a cut extending from said opening to the base portion of the tire circumferentially throughout the entire tire-body, the base portion of said tire being so formed as to fill and be compressed by the rim in which said tire is mounted whereby the edges of the base portion along said cut are maintained in constant contact excepting under the influence of excessive pressure applied to said tire, said tire-body being further provided with a convex tread and side portions united by concave lines and concave portions extending from the lateral convex portions to the base portion of the tire.

In testimony whereof I have hereunto set my hand in presence of two subscribing witnesses.

GODFRED KNADLER.

Witnesses:
GLENARA FOX,
C. E. HUMPHREY.